United States Patent Office 3,733,290
Patented May 15, 1973

3,733,290
POLYAMIDEPOLYAMINE-EPICHLOROHYDRIN
WET STRENGTH RESIN
Laurence Lyman Williams, Stamford, and Anthony
Thomas Coscia, South Norwalk, Conn., assignors to
American Cyanamid Company, Stamford, Conn.
No Drawing. Filed Oct. 12, 1970, Ser. No. 80,181
Int. Cl. C08g 20/38
U.S. Cl. 260—29.2 N                                                       9 Claims

ABSTRACT OF THE DISCLOSURE

Water-soluble cationic thermosetting polyamidepolyamine-epichlorohydrin resins containing phenylene linkages are prepared by reacting ⅓ to ¾ mol of a non-orthophthalic acid with 1 mol of a water-soluble polyalkylenepolyamine, reacting the resulting monomeric phthalamide with ⅔ to ¼ mol of a $C_3$-$C_{10}$ saturated aliphatic dicarboxylic acid to form a chain polymer (the total amount of the acids being ¾ to 5/4 mol per mol of the polyamine), and rendering the chain polymer thermosetting by reaction with epichlorohydrin.

---

The present invention relates to the manufacture of water-soluble cationic thermosetting polymers containing phenylene linkages. The invention includes the polymers themselves and the manufacture of wet strength paper therewith.

In the past it has been proposed to manufacture water-soluble cationic thermosetting wet strength resins by reacting one mol of a phenylenedicarboxylic acid with one mol of a polyakylenepolyamine to form a polyamidepolyamine, and then reacting the polyamidepolyamine in aqueous solution with epichlorohydrin to render the polymer thermosetting. The process has not proved practical because the first reaction requires an unduly high temperature, and because it produces a polyamidepolyamine-which is very difficult to dissolve in water, so that the second step is unduly difficult to perform.

The discovery has now been made that polymers of the above-described type can be readily prepared by performing the first step of the process in two stages and replacing part of the phenylenedicarboxylic acid with a $C_{3-10}$ aliphatic dicarboxylic acid. We have found that when the amount of phenylenedicarboxylic acid in the first stage is limited to ⅓ to ¾ mol per mol of polyalkylenepolyamine and the product of the first stage is reacted with a $C_{3-10}$ saturated aliphatic dicarboxylic acid in reciprocal amount (⅔ to ¼ mol per mol of combined polyalkylenepolyamine in the product), a polyamidepolyamine forms at a comparatively low temperature which dissolves readily in water and, when converted to thermosetting state by reaction with epichlorohydrin is a very satisfactory wet strengthening agent for use in the manufacture of paper.

More in detail, in the first step about ⅓ to ¾ mol of a suitable phenylenedicarboxylic acid is reacted with a water-soluble polyalkylenepolyamine so as to form an essentially monomeric N,N'-di(aminoalkyl)phthalamide. This is most conveniently done by employing the polyalkylenepolyamine in excess; the excess prevents the reaction product from advancing much beyond the monomeric stage. One mol of the polyalkylenepolyamine provides a sufficient amount for formation of the phthalamide and for maintenance of the product in the monomeric stage. The product is water-soluble.

In the second step sufficient (i.e., ⅔ to ¼ mol) of a water-soluble $C_3$-$C_{10}$ saturated aliphatic dicarboxylic acid to increase the total amount of dicarboxylic acid to approximately 1 mol is reacted with the above-described N,N'-di(aminoalkyl)phthalamide, thereby forming a long-chain polyamidepolyamine "backbone." The combined amount of the organic acids should be between about ¾ and 5/4 mol per mol of the polyalkylenepolyamine. This backbone is substantially composed of phenyleneamido, alkyleneamido, and alkyleneamino linkages, and is soluble in acidulated water and in water/isopropanol and water/acetone solutions.

In the third step the aforesaid "backbone" is reacted with epichlorohydrin to convert the backbone to a material which is thermosetting and which possesses effective wet strengthening properties when used as a beater additive in the manufacture of wet strength paper. The amount of epichlorohydrin needed for this purpose varies from instance to instance. However, a suitable amount can be determined by laboratory trial, and is generally within the range of ½ to 2 mols per basic amino group present. The amount of epichlorhydrin which is reacted with the backbone and the extent to which the epichlorohydrin reacts with backbone are limited, so that the polymer, while thermosetting, is water-soluble.

The structure of the resulting polymer has not been definitely ascertained because the backbone chains may be more or less branched and the extent to which the epichlorohydrin causes crosslinking has not been determined. However, where the backbone is prepared from ⅔ of a mol of isophthalic acid, ⅓ mol of adipic acid and 1 mol of diethylenetriamine, the backbone consists essentially of the formula:

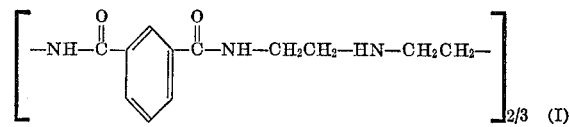

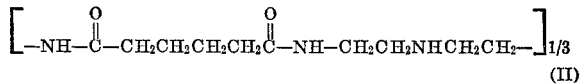

As shown above, the invention contemplates that more than ⅓ mol (up to about ¾ mol) of the phenylenedicarboxylic acid will be used per mol of the polyalkylenepolyamine. Beyond this range extremely high reaction temperatures are required and the products are difficultly water-soluble. Best results have been obtained when first ½ mol of isophthalic acid is reacted with diethylenetriamine or other polyalkylenepolyamine, and the resulting diamide is reacted with about ½ mol of adipic acid.

The reaction between the acids and the polyalkylenepolyamine is normally performed as a hot melt system, and proceeds well in the temperature range of about 125° C. to about 250° C., and no solvent is necessary. This temperature range includes the range at which the reaction between $C_3$-$C_{10}$ aliphatic acids and polyalkylenepolyamines proceeds in 1:1 molar ratio; cf. Keim U.S. Pats. 2,926,116 and 2,926,154.

Reaction of the epichlorohydrin with the polyamide backbone is performed in aqueous medium.

The phenylenedicarboxylic acids used in the process of the present invention are isophthalic acid, terephthalic acid and other equivalent non-ortho phthalic acids, for example the methyl substituted isophthalic acids, which are free from amine-reactive substituents.

As polyalkylenepolyamines, any of the water-soluble members of this class may be used. They include triethylenetetramine, tetraethylenepentamine, and the corresponding polypropylenepolyamines. They contain two primary amino groups and at least one secondary amino linkage.

Any of the common $C_3$-$C_{10}$ saturated aliphatic acids can be employed, for example, succinic, azelaic etc. Adipic acid is preferred because of the good results which it has afforded.

The reaction of the backbone polymer with epichlorohydrin or other halohydrin is most conveniently performed by dissolving the polymer in several times its weight of acidulated water (or in water containing an auxiliary solvent) at any convenient temperature at which the reaction proceeds with convenient rapidity, and adding the epichlorohydrin. The wet strengthening efficiency of the reaction product can be improved by maintaining the solution at an elevated temperature and at a pH between 5 and 10 until a pronounced increase in the viscosity of the solution has occurred as a consequence of the formation of cross-linkages between the backbone chains. Formation of these cross-linkages should be terminated while the polymer is water-soluble and safely distant from its hydrophobe point. The reaction is terminated by cooling the solution to room temperature, adding sufficient water to dilute it to 5%–20% solids, and adjusting the pH to below 6. The resulting solution is sufficiently stable for practical use.

The foregoing solution is employed in the manufacture of wet strength paper by forming an aqueous suspension of cellulose paper-making fibers having a pH in the range of 5–8, adding the solution to the fibrous suspension, forming the fibers in the suspension into a wet web and drying the web in customary manner on rolls having surface temperatures between 190° F. and 250° F.

The polymer solution is advantageously diluted to 1%–5% solids before addition of the pulp to facilitate uniform distribution of the polymer through the fibrous suspensions. The solution is best added at a point near the wire. The polymer is highly cationic and is adsorbed by the fibers substantively from the aqueous medium within a few seconds after addition thereto. The amount to be added depends upon the amount of wet strength which it is desired to impart to the paper. In practice it will generally be found desirable to add an amount between 0.1% and 3% based on the dry weight of the fibers. The paper itself is claimed in our copending application Ser. No. 244,313 filed on Apr. 14, 1972. The polyamidepolyamine backbone disclosed above and the above disclosed process for the manufacture thereof are claimed in our copending application Ser. No. 301,556, filed on Oct. 27, 1972.

The invention is further described in the examples which follow. These examples constitute preferred embodiments of the invention and are not to be construed as limitations thereon.

EXAMPLE 1

The following illustrates the preparation of a polymer according to the present invention wherein the non-ortho phthalic acid is isophthalic acid, the aliphatic acid is adipic acid, the polyalkylenepolyamine is diethylenetriamine, and the molar ratio of the non-ortho phthalic acid to the aliphatic acid is 1/2:1/2.

Under a blanket of nitrogen, 166 g. (1.0 mol) of isophthalic acid is added with stirring over 60 minutes to 206 g. (2.0 mol) of diethylenetriamine in a reaction vessel fitted with take-off condenser. Addition of the isophthalic acid is commenced at room temperature, and an exotherm occurs which raises the temperature to 85° C. The mixture is further heated until water starts to evolve (at about 170° C.). Heating is continued (to about 195° C.) until 27 g. of water and 14 g. of diethylenetriamine have been collected. The reaction mixture is cooled to 160° C. and 146 g. (1.0 mol) of adipic acid is added. The temperature is again gradually raised until 43 g. of water is collected (168° C.–194° C.). To 40 g. of the polymer dissolved in 134 g. of water and 6.5 g. of 36.7% hydrochloric acid at 50° C. are added 19.9 g. of epichlorohydrin (1.2 mol per amino group in the polymer). The solution is then maintained at 65° C. until its Gardner-Holdt viscosity at 65° C. is M. The solution is then diluted to 10% solids by addition of water, cooled to 25° C., and adjusted to pH 4.5 by addition of concentrated HCl.

EXAMPLE 2

The following illustrates the preparation of a polymer similar to the above wherein the molar ratio of the non-ortho phthalic acid to the aliphatic acid is 3/4:1/4.

Under a blanket of nitrogen, 249 g. (1.5 mol) of isophthalic acid is added over 30 minutes to 206 g. (2.0 mol) of diethylenetriamine with stirring in the apparatus of Example 1. The mixture is heated at 180° C. and is maintained at 180° C.–215° C. for three hours until 53 ml. of water and 6 ml. of diethylenetriamine have distilled. The melt is cooled to 165° C. and 73 g. (0.5 mol) of adipic acid is added in one portion. The mixture is heated at 175° C.–210° C. for one hour until 18 ml. of water has been collected. The viscous molten yellow syrup is allowed to solidify by cooling, and 40 g. thereof is dissolved in a solution of 129 g. of deionized water and 9.5 g. of 36.7% HCl at 50° C. To the resulting solution is added 19.4 g. of epichlorohydrin, and the mixture is heated at 65° C. until its Gardner-Holdt viscosity at 65° C. is Q–T. The solution is then cooled, diluted and acidified according to Example 1.

EXAMPLE 3

The following illustrates the preparation of a polymer prepared by reaction of a different non-ortho phthalic acid and a different polyalkylenepolyamine.

The procedure of Example 1 is repeated except that the isophthalic acid is replaced by 222 g. (1.33 mol) of terephthalic acid the adipic acid is decreased to 98 g. (0.67 mol), and the diethylenetriamine is replaced by 378 g. (2.0 mol) of tetraethylenepentamine. A similar polymer is obtained.

EXAMPLE 4

The following illustrates the process of the present invention wherein the parent polyamidepolyamine is reacted with epichlorohydrin in aqueous medium containing an auxiliary solubilizing agent.

To 139 g. of a 3:1 by volume water:acetone solution is added 40 g. of the isophthalic acid-diethylenetriamine-adipic acid product of Example 1, and the resulting solution is heated to 50° C. To this is added 19.4 g. of epichlorohydrin and the resulting solution is maintained at 60° C. until its Gardner-Holdt viscosity is T. The solution is then acidified, cooled and diluted according to Example 1.

EXAMPLE 5

The procedure of Example 4 is repeated except that isopropyl alcohol is present in place of the acetone. A similar product is obtained.

EXAMPLE 6

The procedure of Example 4 is repeated except that the isophthalic acid-diethylenetriamine-adipic acid product of Example 2 is employed. Results are substantially the same.

EXAMPLE 7

The following illustrates the comparative wet strengthening efficiencies of the polymers of Examples 1–3.

An aqueous suspension of a 50:50 mixture of well-beaten bleached hardwood:bleached softwood kraft fibers is prepared at a consistency of 0.6% and aliquots are taken. To each is added sufficient of a 2% solution of one of the polymers of Examples 1–3 to provide the amounts shown in the table below. The aliquots are adusted to pH 7 and are formed into handsheets at a basis weight of 50 lb. per 25"×40/500 ream, which are dried for 2 minutes on a laboratory drum drier having a drum temperature of 240° F. The wet strengths of the sheets are then determined by standard laboratory method. Results are as follows:

| Run No. | Ex. No. | Polymer Acids Name | Mol | Name | Mol | Polyamine | Percent added [1] | Paper wet strength [2] |
|---|---|---|---|---|---|---|---|---|
| 1 | 1 | Isoph.[3] | ½ | Adip.[4] | ½ | DETA[5] | 0.25 | 3.7 |
| 2 | 1 | Isoph.[3] | ½ | Adip.[4] | ½ | DETA[5] | 0.5 | 5.4 |
| 3 | 2 | Isoph.[3] | ¾ | Adip.[4] | ¼ | DETA[5] | 0.25 | 3.9 |
| 4 | 2 | Isoph.[3] | ¾ | Adip.[4] | ¼ | DETA[5] | 0.5 | 5.0 |
| 5 | 3 | Tere.[6] | ⅔ | Adip.[4] | ⅓ | TEPA[7] | 0.5 | 5.0 |
| 6 | 4 | Isoph | ½ | Adip.[4] | ½ | DETA | 0.25 | 3.3 |
| 7 | 5 | Isoph | ½ | Adip.[4] | ½ | DETA | 0.50 | 4.8 |

[1] Based on dry weight of fibers.
[2] Lb. per inch.
[3] Isophthalic acid.
[4] Adipic acid.
[5] Diethylenetriamine.
[6] Terephthalic acid.
[7] Tetraethylenepentamine.

We claim:

1. Process for the manufacture of an aqueous solution of a water-soluble thermosetting cationic polymer containing phenylene linkages, which consists essentially in reacting in the range of about 125° C.–250° C. between ⅓ and ¾ mol of a non-ortho phthalic acid with 1 mol of a water-soluble polyalkylenepolyamine thereby forming a water-soluble essentially monomeric N,N′-di(aminoalkyl)phthalamide, reacting in the range of about 125° C.–250° C. said phthalamide with between ⅔ and ¼ mol of a $C_3$-$C_{10}$ saturated aliphatic dicarboxylic acid, the combined amount of said non-ortho phthalic acid and said aliphatic dicarboxylic acid being between ¾ mol and ⁵⁄₄ mol per mol of polyalkylenepolyamine, thereby forming a water-soluble chain polymer substantially composed of phenyleneamido, alkyleneamido, and alkyleneamino linkages, and reacting said polymer in an aqueous solution with sufficient epichlorohydrin to form a polymer which is water-soluble and thermosetting.

2. Process according to claim 1, wherein the non-ortho phthalic acid is isophthalic acid.

3. Process according to claim 2, wherein the polyalkylenepolyamine is diethylenetriamine.

4. Process according to claim 1, wherein the essentially monomeric phthalamide is prepared by reaction of ½ mol of isophthalic acid with diethylenetriamine.

5. Process according to claim 1, wherein the aliphatic dibasic carboxylic acid is adipic acid.

6. Process according to claim 1, wherein the amount of epichlorohydrin added is 1 to 1.5 mol per mole of amino groups present in the polymer.

7. The process according to claim 1, wherein the polymer substantially composed of phenyleneamido, alkyleneamido and alkyleneamino linkages is in aqueous solution when reacted with the epichlorohydrin.

8. The process according to claim 7, wherein the aqueous solution contains isopropyl alcohol as auxiliary solvent.

9. The aqueous polymer solution having a pH in the range 4–6 prepared by the process according to claim 1.

References Cited

UNITED STATES PATENTS

| 3,329,657 | 7/1967 | Strazdins et al. | 260—78 SC |
| 3,125,552 | 3/1964 | Loshaek et al. | 260—78 SC |
| 3,239,491 | 3/1966 | Tsou et al. | 260—78 SC |
| 3,584,072 | 6/1971 | Winslow | 260—78 SC |

HAROLD D. ANDERSON, Primary Examiner

U.S. Cl. X.R.

162—164; 260—78 SC, 78 TF